July 9, 1957  A. ALFORD  2,799,017
SLOTTED CYLINDRICAL ANTENNAS
Original Filed Aug. 31, 1946  6 Sheets-Sheet 1
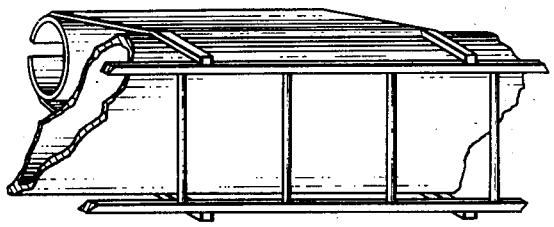
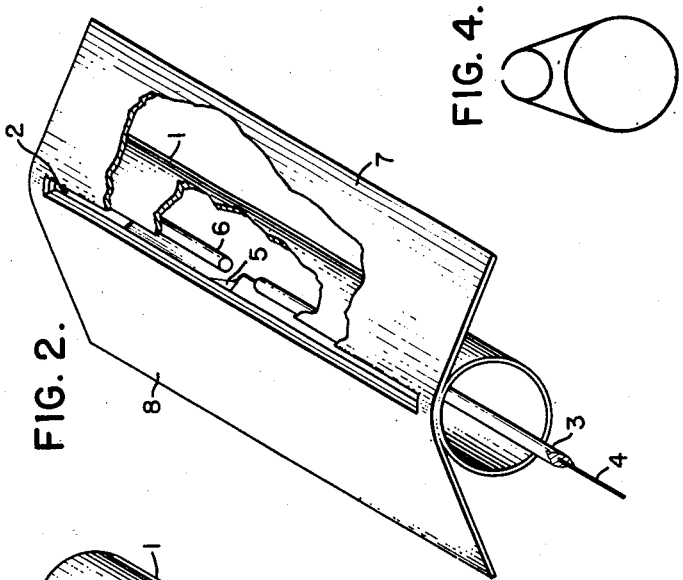
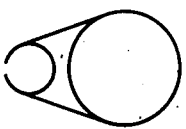
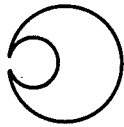
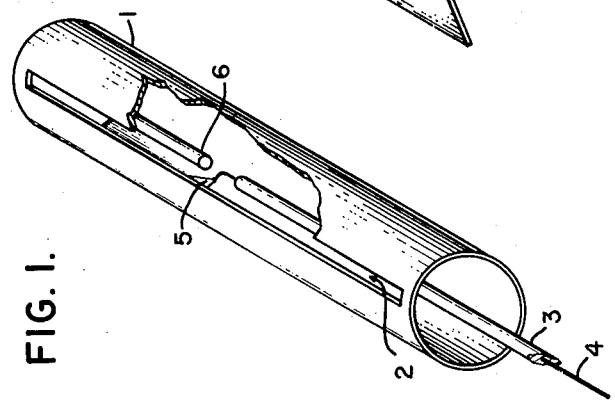
INVENTOR.
ANDREW ALFORD
BY
ATTORNEY

INVENTOR.
ANDREW ALFORD

*INVENTOR.*
ANDREW ALFORD

July 9, 1957  A. ALFORD  2,799,017
SLOTTED CYLINDRICAL ANTENNAS
Original Filed Aug. 31, 1946

INVENTOR.
ANDREW ALFORD
BY
ATTORNEY

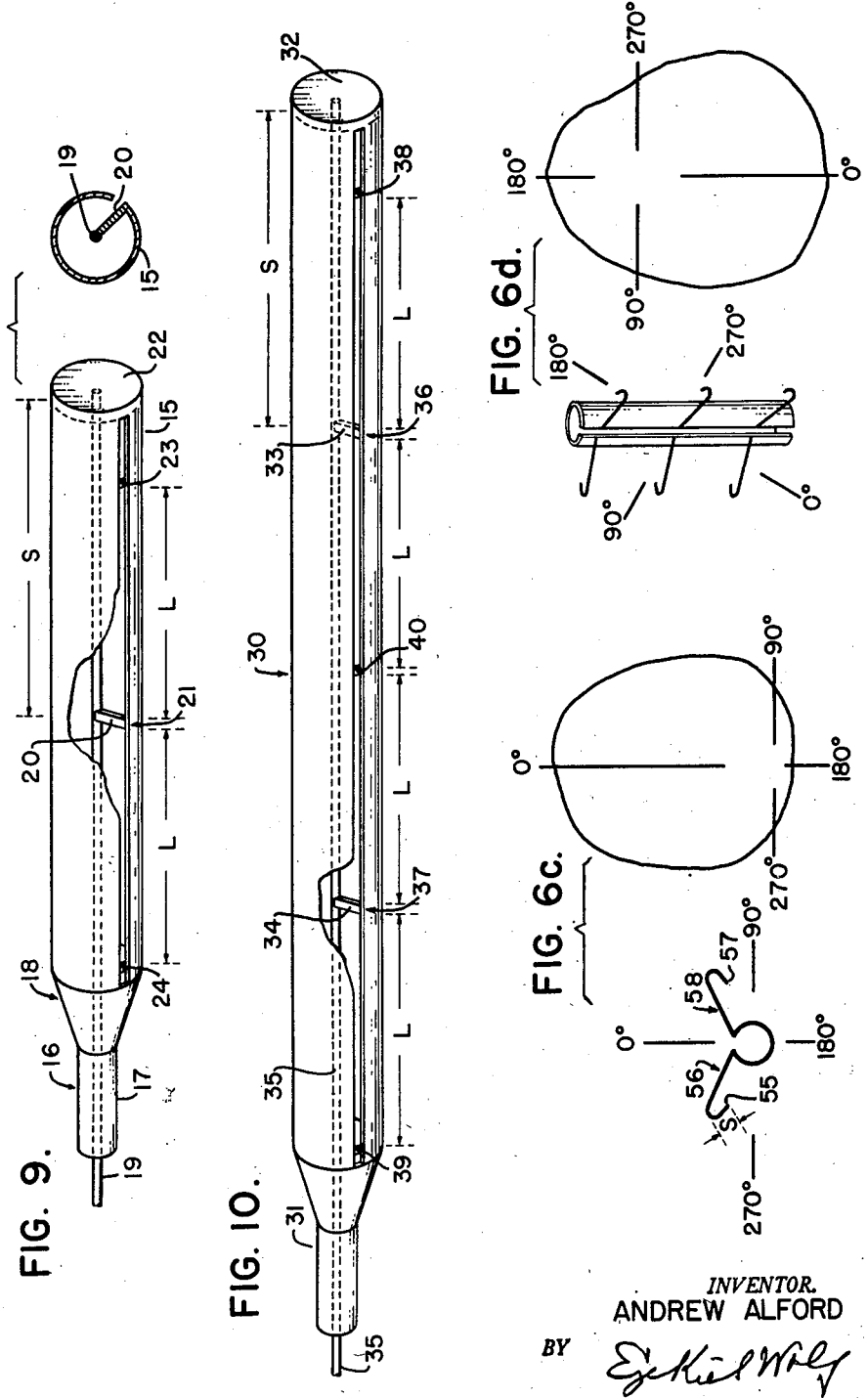

July 9, 1957 A. ALFORD 2,799,017
SLOTTED CYLINDRICAL ANTENNAS
Original Filed Aug. 31, 1946 6 Sheets-Sheet 6
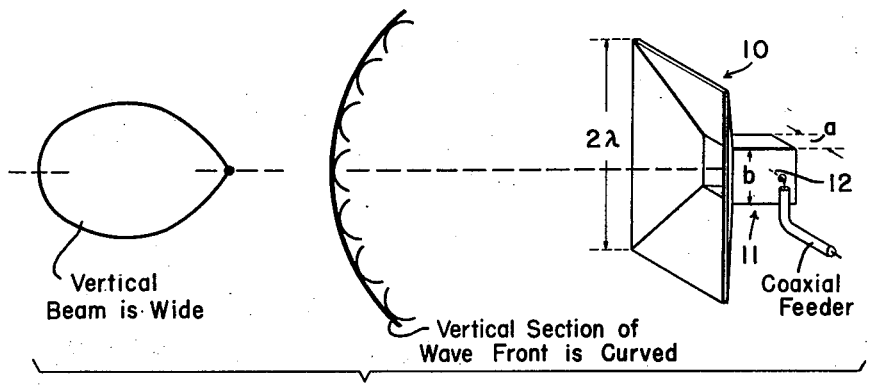
FIG. 2a.
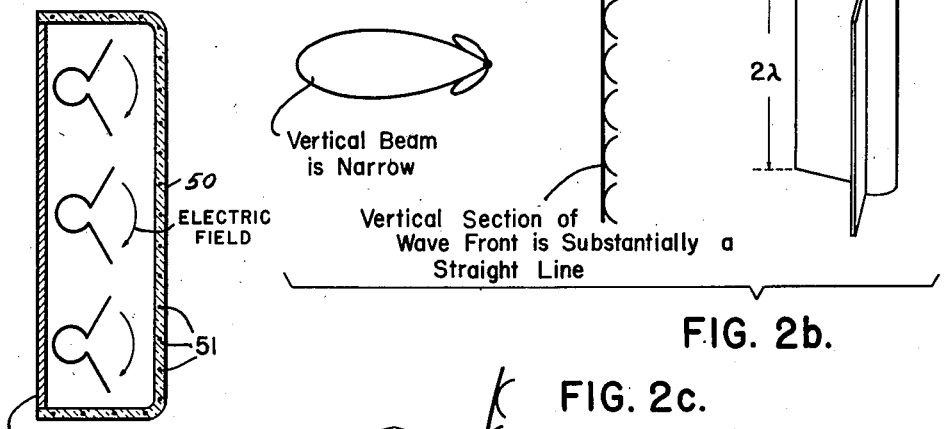
FIG. 2b.
FIG. 2c.
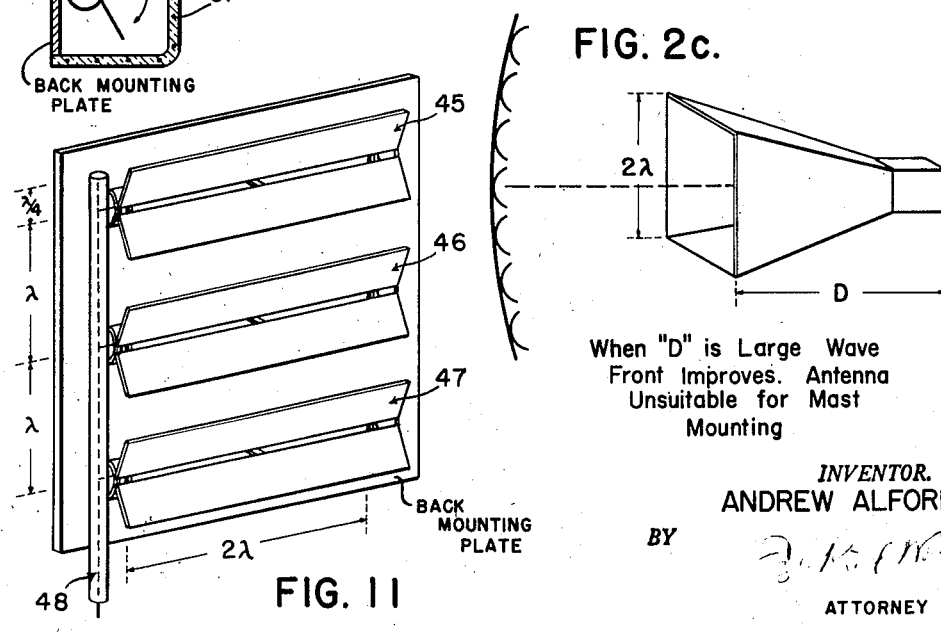
FIG. 12.
FIG. 11
INVENTOR.
ANDREW ALFORD
BY
ATTORNEY

United States Patent Office 2,799,017
Patented July 9, 1957

2,799,017

SLOTTED CYLINDRICAL ANTENNAS

Andrew Alford, Cambridge, Mass.

Original application August 31, 1946, Serial No. 694,319, now Patent No. 2,611,867, dated September 23, 1952. Divided and this application August 30, 1952, Serial No. 307,333

16 Claims. (Cl. 343—767)

The present invention is a division of my copending application Serial No. 694,319, filed August 31, 1946, which has now matured into Patent No. 2,611,867, patented September 23, 1952, and is a copy of the application mentioned as above filed.

This invention relates to new and useful improvements in antennas. More specifically, it relates to improvements in means for controlling the directivity of antennas for high frequency electromagnetic signals.

In making devices which will operate at ultra high frequencies, many new problems arise but, at the same time, new approaches to the solutions both of old problems and new ones become possible.

One of the problems encountered in the development of television to be broadcast in the ultra high frequency region between 480 and 920 megacycles is that power-generating means capable of high power levels of modulated output are difficult to obtain. Besides the fact that technological and design difficulties are encountered in signal transmitters having high power levels, there are other difficulties which are outgrowths of the main problem. For example, equipment capable of putting out large amounts of radio frequency power requires a correspondingly large wide band modulator, and this presents additional difficulties and expense. Furthermore, such a high power radio frequency transmitter and wide band modulator consume large amounts of input power, because of relative inefficiency.

Accordingly, it is very desirable to make the most effective use of amounts of power economically available in ultra high frequency operations, for example in television, by securing a compensatingly high efficiency in some other part of the system (than the energy-generating source). Such another part of the system may be the power-radiating device, i. e. the antenna. If the antenna is designed to emit energy in useful directions only, there will be an avoidance of wasted power, and so far as the service area is concerned, the power level will be increased by the antenna gain. From a practical standpoint, this is just as useful as increasing the output of the transmitter by an equal factor. Moreover, antennas, when once built, present a minimum problem of maintenance and renewal in contrast with the expensive high power tubes in the transmitter.

Compact, economical, high gain antennas suitable for use at ultra high frequencies are described in my copending applications Serial No. 640,690 filed January 12, 1946, now Patent No. 2,625,654, Serial No. 641,692, filed January 17, 1946, now abandoned, and Serial No. 644,519, filed January 31, 1946, now abandoned. These applications disclose slotted "cylindrical" antennas each of which emits radiant energy concentrated along lines pointing substantially towards the horizon if the long axis of the cylinder is vertical, and each of which has an unusually long "aperture" for a device having a single feed point. Each antenna also features a loaded "transmission line" along which R. F. energy moves with a phase velocity greater than the speed of light, whereby a simple feed system is adequate for a relatively large "aperture" and R. F. voltages along the aperture are in proper phase.

Another feature of those antennas is that they have suitable input impedances so that the feed in each is accomplished by the direct connection of a low impedance feed line to the antenna without the use of critical transforming circuits.

Another feature is that the polarization of any one of these antennas, when it is mounted with its long axis in a vertical position, is horizontal. This polarization is a desired one because of general television broadcast practice.

Another feature of these antennas is that generally they are free from horizontal directivity.

Another feature of these antennas is that they have large operating band widths.

In certain applications it is desirable to effect further economies in the use of radiating power by employing directivity in horizontal planes as well as directivity in vertical planes. For example, if a transmitting station should be located alongside of a large body of water, such as a lake or ocean, or alongside a desert, it would be as undesirable to waste radiant power over the water or desert (a non-service area) as to waste it by propagation directly upward. For this reason, it is desirable to be able to control the horizontal directivity of any of these otherwise ideal radiators. In particular, because of the great advantages of the antennas described in my copending applications, it is especially desirable that means be devised whereby their horizontal directivity characteristics can be controlled without materially altering their other, presently useful, characteristics of efficient vertical directivity, suitable input impedance, horizontal polarization, and broad operating band.

It is an object of this invention to devise means adapted to control the horizontal directivity of slotted cylindrical antennas without materially altering their useful characteristics.

Other objects, features and advantages of this invention will be apparent from the description which follows and from the drawings in which:

Fig. 1 is an isometric view of one embodiment of a slotted cylindrical antenna in which a portion of the cylinder adjacent to the slot is broken away to show the feed line;

Fig. 2 is an isometric view of an antenna as in Fig. 1, with the addition of structure comprising "wing" elements according to this invention;

Fig. 2a is a diagrammatic representation of an ordinary electromagnetic horn and of some of its characteristics;

Fig. 2b is a diagrammatic representation of an embodiment of this invention and of some of its features in a manner corresponding to the representation of Fig. 2a;

Fig. 2c is a diagrammatic representation as in Fig. 2a with respect to another ordinary electromagnetic horn;

Fig. 3 is an isometric view of a mast mounting of another embodiment of a slotted cylindrical antenna employing wing elements according to this invention;

Fig. 4 is a diagrammatic representation of a transverse cross section of the antenna and mast of Fig. 3. It does not include any representation of the ladder as in Figure 3.

Fig. 4a is a diagrammatic representation of a transverse cross section of an embodiment of this invention having structure similar to that of the embodiment of Fig. 3, but different therefrom in that structural simplications have been effected whereby the mast and the "wing" elements are formed as a unitary structure;

Figure 5:
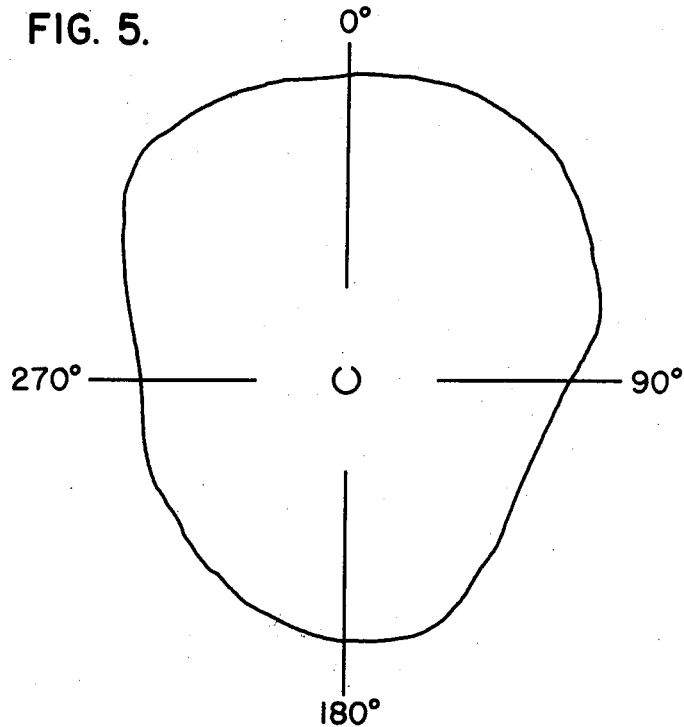
Fig. 5 is a polar diagram showing the horizontal directivity of an antenna as in Fig. 1.
Figure 6:
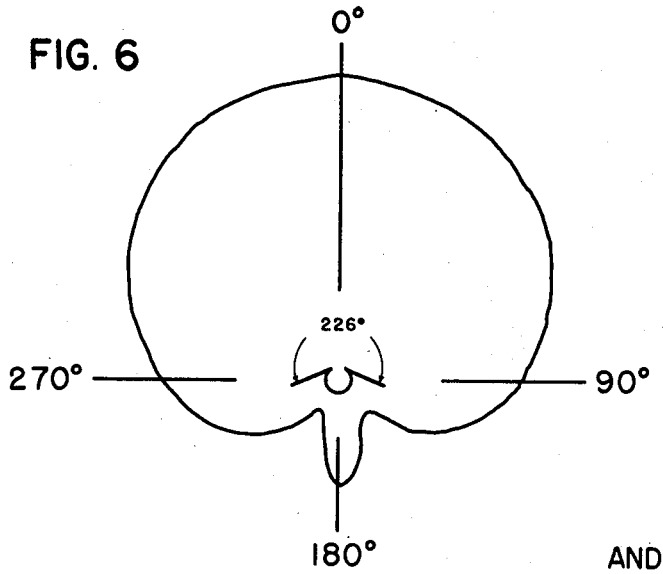
Figure 6A:
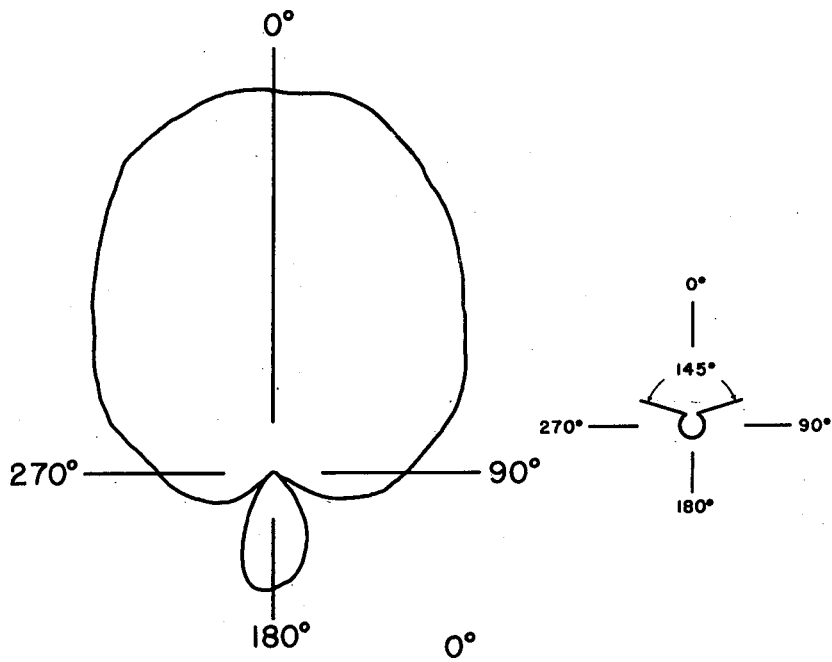
Figure 6B:
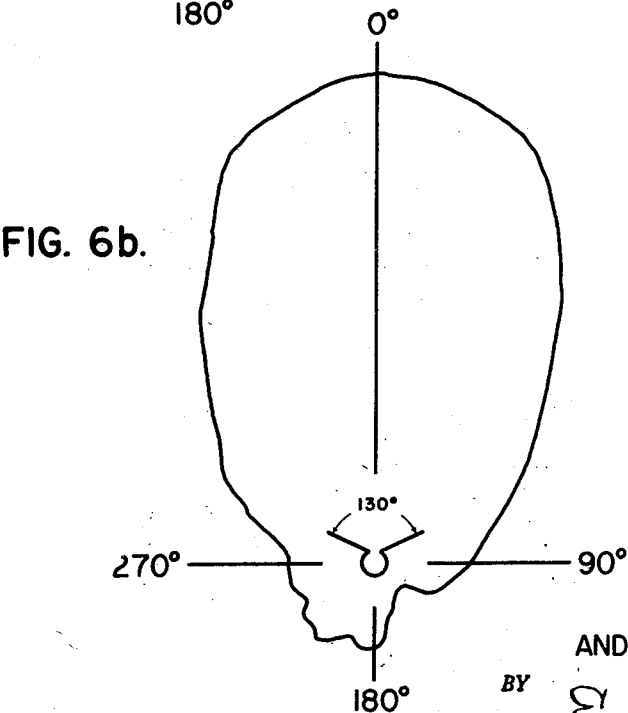
Figure 7:
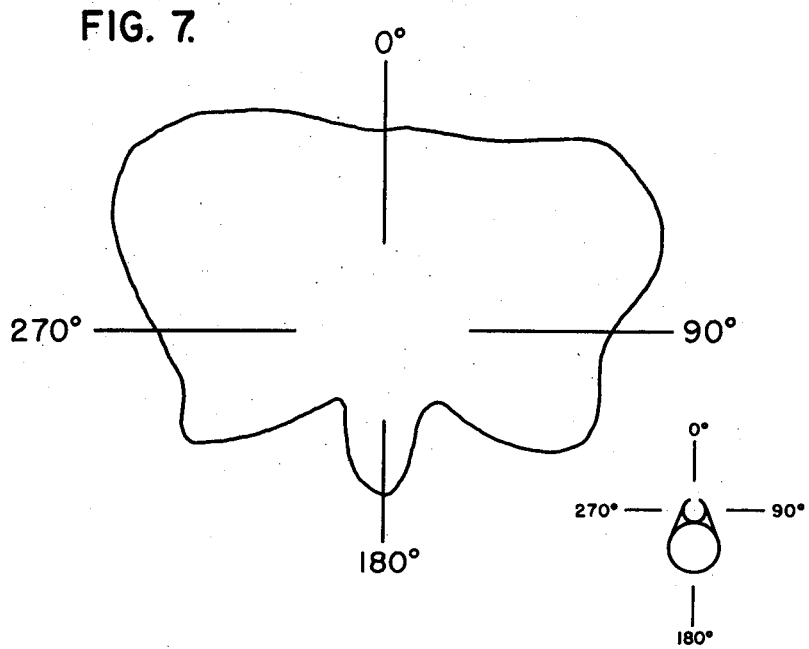
Figure 8:
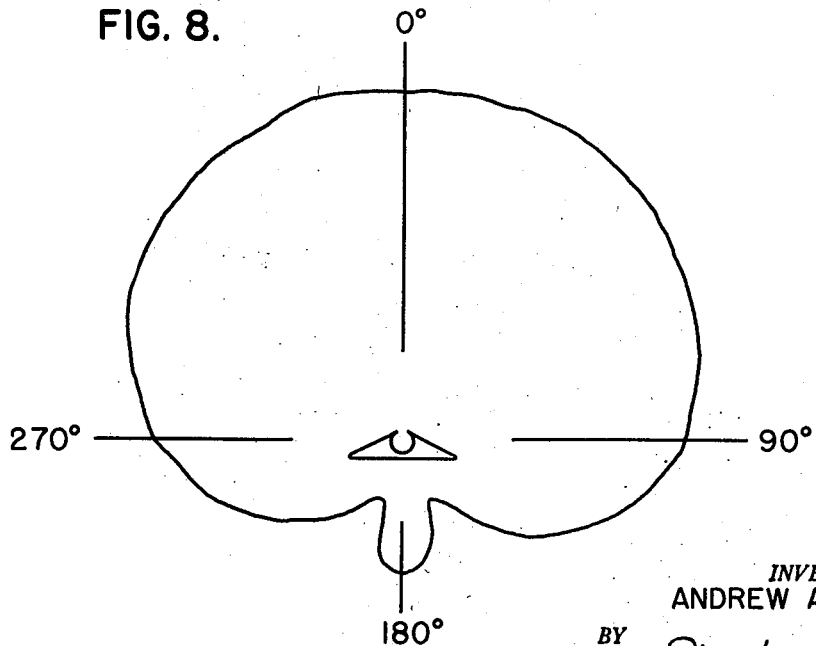

Figs. 6, 6a, 6b, 6c and 6d are similar polar diagrams showing the horizontal directivity of the antenna used in obtaining the plot of Fig. 5 after it was modified by the addition of various embodiments of wing elements. The diagrams offer a convenient means for comparing effects on horizontal directivity of the use of different amounts of angular spread between the wing elements and of other variations in the manner in which the wing elements are applied;

Fig. 7 is a polar diagram showing the horizontal directivity of an antenna as in Fig. 4;

Fig. 8 is a polar diagram showing the horizontal directivity of another embodiment of the present invention;

Fig. 9 is a diagrammatic representation of another embodiment of a slotted cylindrical antenna which may be used with wing elements according to this invention;

Fig. 10 is a diagrammatic representation of another embodiment of a slotted cylindrical antenna which also may be used with wing elements according to this invention;

Fig. 11 is a diagrammatic representation of an array composed of slotted cylindrical antennas either according to Fig. 9 or 10 and including wing elements according to this invention;

Fig. 12 is a diagrammatic representation of the manner in which structure may be added to an array as in Fig. 11 to protect it from the elements.

The slotted cylindrical antenna of Fig. 1 has a cylindrical body portion 1 with a longitudinal opening, slot 2, in one side which extends along substantially its full length and is substantially parallel to the long axis of portion 1. A coaxial feed line having an outer conductor 3 and an inner conductor 4 extends into the interior of portion 1 with the outer conductor 3 lying adjacent to its inner wall and near to one edge of slot 2. An electrical connection (not shown) is made between outer conductor 3 and the conductive structure of portion 1 at a point preferably near to one edge of slot 2 the edge which is on the right of slot 2 as the slot is shown in the drawing. Inner conductor 4 is electrically connected to the other edge of the slot at a point substantially midway between its ends, and the connection may be made through a triangularly shaped "dog ear" piece of conductive sheet material 5 whose intended electrical function is to reduce reflections which might occur at the point of connection. Slot 2 does not extend to the ends of portion 1. Therefore, substantially zero impedance terminations occur at both ends of the slot. This particular embodiment of a slotted cylindrical antenna is center fed. It employs a "cylinder" of circular cross section; it has fixed (non-adjustable, i. e. non-sliding) short circuits at both ends of the slot; it is made of solid metallic material in the structure of its body portion; and it is fed by a coaxial line. However, this particular single embodiment is shown herein only to indicate, as shown in Fig. 2 and as described below, the manner in which modifying structure employed according to this invention is added to a typical slotted cylindrical antenna.

The improvement in slotted cylindrical antennas according to this invention may be applied to the structure of any slotted cylindrical antenna and, in particular, to any of the various antennas described in the above-mentioned copending applications. Therefore, the scope of this invention includes many embodiments which may be derived by various combinations of antenna structures described in those applications and appropriate forms of the modifying wing structures described herein.

In many embodiments of slotted antennas, the "cylindrical" body portions are formed with cross sections which are not circular but instead may be rectangular, oval, square, triangular, or irregularly shaped. In certain embodiments, the physical structure of the body portion is not a mechanically continuous structure of conductive material, i. e. is not identical to a smooth piece of sheet metal bent into a slotted "cylindrical" tube, but may be of wire netting, of a stack of hooplike structures having a common axis, each hoop being open at one side and having the ends of its opening abutting on and fastened to parallel wires which electrically are similar to the edges of slot 2, or of plastic material with conductive material affixed to or embedded in it. The physical structure, in fact, can be varied freely, without markedly changing the electrically effective composition of the antenna.

In many embodiments certain short-circuiting elements are movable along the slot for adjustment purposes. Some employ a single short circuit which may be near one of the ends. Some are not short-circuited at either end, and some use a plurality of short circuits and of feed points. The feed may be effected through parallel transmission lines or through coaxial lines. It may be applied at the center of the slot or at other points, as, for example, at one of the ends. The slot and/or the ends of the "cylinder" may be mechanically sealed, as with a dielectric plastic. The antenna may be mounted on a mast or may comprise its own supporting structure, as, for example, when it is set up on one of its ends on a "ground plane," such as a metal roof. Conductive structure may be inserted within the body portion to control the electrically effective cross-sectional area by what may be described as short-circuiting some of the space therein. In fact, in the embodiment shown in Fig. 1, the bar (or tube) 6 serves a space-short-circuiting function so that electrically effectively the half of portion 1 beyond the feed point will be of the same cross-sectional area as the half through which the feed line extends.

In some embodiments the cross-sectional area of the cylinder and/or the slot length are critical in determining directivity and gain, and the slot width and the thicknesses of the opposing edges of the slot must also be substantially in accordance with predetermined specifications.

Fig. 2 substantially comprises the structure of Fig. 1 with the addition of structure comprising wings 7 and 8. As is indicated in the drawing, wings 7 and 8 may be parts of a single sheet of conductive material, such as metal. A slot of about the same size as slot 2 of Fig. 1 is cut in this sheet and the sheet is electrically connected to portion 1, with both edges and both ends of the two slots substantially coincident.

The connection may be made by any convenient means, such as soldering, welding, bolting or riveting. The wings, in the embodiment shown in Fig. 2, have an angle of divergence between their front surfaces, i. e. an angle of divergence measured between their surfaces on the forward side of the slot, that is greater than 180°. However, the wings may be initially installed or later bent so as to have different desired angles of divergence. The angle selected will have a specific effect on the "horizontal" directivity of the antenna. If desired, each wing may be a separate sheet of metal. The wings, or the unitary structure comprising them, may be of some physical structure other than solid sheet metal but, nevertheless, electrically equivalent thereto. As explained below, in some embodiments the wings may be constructed so that even electrically they represent conductive areas which are somewhat less than continuous and uninterrupted. The wings may be attached precisely on the edges of the slot or they may be attached on elongated areas of the outer surface of the cylinder which are substantially parallel to the edges of the slot but are located at predetermined distances back from the edges.

When the antenna of Fig. 1 is energized, the potential thus existing between outer conductor 3 and inner conductor 4 is applied across slot 2. By making portion 1 of such size that its inside cross-sectional area is of the order of .014 square wave length, it is possible to produce a substantially co-phasal difference of potential over the entire length of slot 2 when the slot is approximately two wave lengths long. The currents produced by the differences of potential existing across the slot flow circumferentially around the cylinder. The field which is radiated by these circumferential currents is similar to that which would be radiated by a stack consisting of a large number of small coaxial loops. The radiant field is horizontally polarized when the long axis of the cylinder is vertical. The maximum field is radiated in the plane perpendicular to the axis of the cylinder and passing through its center. The minimum field is radiated in the direction of the long axis of the cylinder. When the length of the slot is approximately two wave lengths, the inside cross sectional area is approximately .014 square wave length, and the slot width is of the order of .01 wave length, the radiation pattern in a plane passing through the axis of the cylinder consists of two opposing narrow major lobes with maxima at right angles to the cylinder axis. When several such antennas are arranged in a vertical array with the individual antennas mounted one above another, still greater concentration of radiant power is obtained in a horizontal plane, that is, in the directions of the service areas. The main advantage of the slotted cylindrical antenna is that a great concentration of radiant energy may be obtained with only few individual elements and, therefore, also with few branch feeders, fittings and other items of feeder hardware.

In accordance with the present invention and as stated above, these advantages of the cylindrical antenna may be obtained even when it is desired not only to concentrate the radiant energy in the plane of the service area but also to distribute this energy in a desired manner within this service area, this useful result being accomplished by the addition to the cylindrical antenna of the elements herein designated as "wings."

The difference of potential across the slot produces a flow of currents in the wings. The predominant direction of the current is at right angles to the long axis of the slot. The currents, which in a slotted cylindrical antenna without wings are circumferential, are, at least in part, diverted into the added wings. This change in the path of the currents results in changes in radiation patterns in planes at right angles to the cylinder axis. By controlling the size of the wings, their shape (for example, by making the wings not rectangular but with curved or serrated edges), and the angle between them it is possible to control the radiation patterns in planes perpendicular to the cylinder axis.

The fact which makes this method of controlling the pattern particularly useful is that the addition of wings to a slotted cylinder antenna does not destroy its main advantage of concentrating radiant energy in the plane at right angles to the axis of the cylinder and passing through the center of the cylinder. Contrary to what might be expected tests show that the addition of wings to a slotted cylindrical antenna produces only small effect on the propagation velocity along the slot and that this velocity of propagation and, therefore, also the distribution of potential difference between the edges of the slot are still controlled by the cross-sectional area of the cylinder, and that even large changes in the shape or relative angle between the wings have only minor effects on the potential distribution. Because of these phenomena, the design of efficient antennas with wings is made relatively very simple. The dimensions of the slotted cylinder are chosen as if no wings were to be added. The wings of desired shape are then added to the cylinder. Since good concentration of radiant power is obtained with slotted cylinders having cross-sectional areas of the order of .014 square wave length, the same dimensions hold good for cylinders with wings. Minor adjustments of slot length are sometimes necessary with some of the wing arrangements, but these adjustments may easily be made, for example, by providing the slot with movable short-circuiting bars. As the angle between the wings is made smaller, for example under 130° the loading effect of the wings becomes more pronounced. This loading effect of the wings may be controlled by changing the capacity per unit length between the edges of the slot. By increasing this capacity per unit length, the coupling between the wings and the cylinder is decreased and, therefore, also the loading effect of the wings is decreased. The effect of the increased capacity on the propagation of waves inside the cylinder may be compensated for by decreasing the cross-sectional area of the cylinder. Thus, even when the angle between the wings is relatively small it is still possible to produce co-phasal excitation of a slot which is longer than one wave length at the center frequency of the operating frequency band.

In order to explain another feature of the present invention, the slotted cylinder radiator with wings will be compared with an ordinary electromagnetic horn, shown in Fig. 2a. Such a horn consists of a flared horn portion 10, a length of wave guide 11, and a stub wave guide feeder 12. It is general practice to make cross-sectional dimensions of the wave guide such that the long dimension $b$ is less than one wave length but greater than a half wave length, and the small dimension $a$ is approximately one-half of dimension $b$. Dimension $b$ is made less than one wave length in order to avoid the generation of the second mode of propagation which, if present, would distort the beam produced by the flare of the horn. It is well known that by diverging the sides of the flare a narrower beam in the vertical plane may be achieved, but that because of the divergence of waves in the flare, the vertical section of the wave front is curved and, therefore, for a given aperture size, the beam is not as narrow as it would be if the wave front section were a straight line, which would be the case if the excitation of the waves were co-phasal. In contrast with the ordinary horn the slotted cylinder antenna of this invention is made approximately two wave lengths long, so that the aperture of two wave lengths may be excited co-phasally. Therefore, a cylindrical and not spherical wave front is produced so that, for a given vertical size, a narrower beam in vertical planes is obtained. This co-phasal excitation of the aperture and, therefore, narrower beam are made possible through the action of the cylinder having a cross-sectional area of the order of .014 square wave length. A comparison of Figs. 2a and 2b clearly shows this distinction. Though the largest vertical dimension of the horn is as large as that of the slotted cylindrical antenna (with wings), the vertical directivity of the horn is far less pronounced.

Still another distinction between the slotted cylinder with wings and the electromagnetic horn is that the wings may be bent back, at in Fig. 2, making an angle over 180° without affecting the narrowness of the beam in vertical planes. When the flare of an electromagnetic horn is bent back in the same manner, a wide beam is obtained in the vertical plane because there is no way for the waves to diverge to a greater effective aperture. The original wave guide aperture, which is less than one wave length, is, therefore, the effective aperture, and the corresponding beam is wide.

As is obvious in Fig. 2c, it is possible to increase the directivity of a horn without increasing the size of its aperture. This may be done by increasing the length dimension (dimension D in Fig. 2c). However, a horn comparable in directivity to a slotted cylindrical antenna of equal aperture size would be too large for convenient use on a mast.

Fig. 9 shows a slotted cylinder 15 which is energized by a concentric transmission line 16. The outer conductor 17 of the concentric feeder 16 is connected to the cylinder 15 through a tapered matching section 18. The inner conductor 19 of feeder 16 is continued into cylinder 15 along the cylinder axis. A branch feeder 20 is used to connect the inner conductor to one side of the slot at a point 21 which is approximately one-quarter wave length below the center of the cylinder. The distance S from point 21 to the short-circuiting plate 22 is made approximately one and one-quarter wave lengths long. Short-circuiting bars 23, 24 are connected to both sides of the slot at points which are equidistant from point 21. Distances L from the short-circuiting bars to point 21 are adjusted for best distribution of the differences of potential along the two edges of the slot. When the cross-sectional area of the cylinder less the cross-sectional area of the inner conductor is of the order of .014 square wave length, good results are obtained by making each distance L approximately one wave length long. In this arrangement, cylinder 15 performs at least three functions: Cylinder 15 acts as the radiating element, as the outer conductor of the concentric feeder, and as a distributed inductive element providing the required loading for the balanced transmission line consisting of the edges of the slot.

This arrangement is particularly convenient when the operating frequency is very high because then the diameter of cylinder 15 is too small for the installation of a concentric feeder in the manner shown in the embodiment of Fig. 1.

Fig. 10 shows what is, in effect, an array of two cylinders of the kind shown in Fig. 9. This structure consists of a single slotted cylinder 30 which is energized by concentric feeder 31. The inner conductor of feeder 31 is continued along the axis of cylinder 30 to short-circuiting end plate 32. Two branch feeders 33, 34 are used to connect the inner conductor 35 to the same edge of the slot at points 36, 37. The branch feeder 33 is connected at distance S equal to approximately one and one-quarter wave lengths from the end plate 32. The short-circuiting bars 38 and 40 and 39 and 40 respectively, are placed at equal distances L, approximately equal to one wave length, from points 36 and 37.

Since the distance along inner conductor 35 between the branch feeders 33, 34 is substantially two wave lengths, the same edges of the slot are energized in phase. Cophasal excitation is, therefore, obtained throughout the entire length of a slot four wave lengths long. A similar system may be used to excite a slot six or eight wave lengths in length.

Slotted cylindrical radiators of the types shown in Figs. 9 and 10 may be equipped with wings in the same way as radiators of the type shown in Fig. 1.

A plurality of slotted cylindrical radiators, as in Fig. 9 or Fig. 10, provided with pairs of wings which make angles of the order of 140°, may be combined together to form a very directional array, as shown in Fig. 11. In this figure 45, 46 and 47 are elements like the antennas of Fig. 9 or Fig. 10 equipped with wings. All of the elements are connected to a main feeder 48 at points separated by one wave length. Such an array will provide very high power gain per cubic foot of array.

Fig. 12 shows convenient structure for protecting an array as in Fig. 11 from the elements. Dielectric cover box 50, which may conveniently be made of fibre glass, can be placed over the array with its open end abutting against the back mounting plate. Moreover, wires may be embedded in box 50 through which currents may be passed in order to heat the box and melt accumulations of ice or sleet. Since the electric field at points in front of such an array is at right angles to the direction of the slots, wires such as 51 may pass in front of the array and have substantially no effect. These wires may be embedded in the thin sheet of fibre glass composing box 50 and use as heating elements for removing sleet from the fibre glass while the fibre glass sheet itself is used to exclude water from the slots.

A few of a large variety of horizontal patterns which may be achieved by the use of slotted cylinder radiators with wings are shown in Figs. 6, 6a, 6b, 7 and 8. Figs. 6, 6a, 6b and 8 show the major trends which may be expected with straight wings with or without a back plate behind the antenna.

Fig. 6c shows the effect of bending the edges of straight wings. When the dimension S shown in Fig. 6c is of the order of one of several tenths of the wave length, the potential along edge 55 of wing 56 is different from the potential of the portion of wing 56 opposite edge 55, behind the wing, and the space between edge 55 and that portion forms a wide radiating slot. A similar slot is formed by edge 57 and wing 58. The effect of these secondary slots is to send back radiation in a phase opposite to that of the minor lobe in Fig. 6a, thus eliminating this minor lobe.

By making the solid wings into a comblike structure, consisting only of a few rods, the effect of the wings is decreased and a pattern of the type shown in Fig. 6d may be obtained.

Still another type of pattern may be had by bending the wings around a tubular mast. This is shown in Fig. 7. This pattern was obtained with a twenty-inch mast and with the radiator operating at 450 mc. The effect of such objects as metal ladders or feeders behind large wings is minor unless metal objects behind the wing have dimensions greater than the wing itself. This is true even when the wings are bent around a mast, as in Fig. 3.

Fig. 4a shows still another type of wing which is a tube of circular cross section.

It will be seen from the above description of the slotted cylinder with wings that the cylinder performs the function of a feeder for the wings and may, therefore, be called a feeder cylinder. The wings are the radiators. In some cases only a small portion of the total current is diverted into the wings, for example, in the case of the radiator of Fig. 6d. Then, the outer surface of the feeder cylinder itself also performs the function of the wings. This is an example of a divided wing. It is possible by making wings of four sets of rods to construct wings in which the current is divided into three parts on each side of the slot. In this case the current is divided between the two sets of rods and the outer surface of the cylinder.

The shape of the feeder cylinder need not be circular. Whatever the shape of the cylinder cross section, the cross-sectional area of the cylinder should be of the order of between .01 and .02 square wave length and preferably of the order of .014 square wave length.

In some cases when the slot is loaded by the capacity of thick edges of the slot or by other means, the cross-sectional area for best results may be even less than .01 square wave length. Also with some wing arrangements it may be necessary to use a cross-sectional area greater than .02 square wave length. When there is some doubt as to what value of the cross-sectional area should be used, it is best to measure the distribution of potential differences along the slot. The correct value of the cross-sectional area should result in the potential differences along the slot being distributed in the following way:

(1) The maximum of potential should occur at points intermediate between the feed point and the short-circuiting points (or bars) along the slot.

(2) The potential should decrease from the maxima toward the feed point, without there being distinct minima between the maxima and the feed point.

(3) The correct cross-sectional area should result in a potential difference distribution of this kind when the distance between the short-circuiting bars is of the order of two wave lengths, assuming that both ends of the slot are short-circuited.

In one embodiment of this invention, the wings are added to a feeder cylinder which is made not of a sheet of metal but of a number of coaxial loops, as described in the copending application, No. 70,752, filed January 13, 1949, now Patent No. 2,622,196.

Experiment shows that if the wings are made of rods, two rods per each loop, or two rods per every other loop, or two rods per every third loop, the best dimensions of the feeder cylinder are not materially altered; that is, they still should be as described in said copending application. The types of patterns which are obtained with this arrangement are similar to those described in connection with sheet metal cylinders.

The effect of the wings is reduced when they are constructed of two rods per every other loop and this effect is still further reduced when two rods are used for every third loop, and so forth.

Having now described my invention I claim:

1. An antenna including a cylindrical conductive shell with a slot extending lengthwise thereof and terminating near the ends of the cylinder, means for feeding the cylinder comprising a coaxial line having an inner and outer conductor, said outer conductor having a section merging into the end of the cylindrical shell, said inner conductor extending lengthwise of the shell, in a line spaced from the wall of the shell, and conductive members extending from said inner conductor at spaced intervals to the vicinity of said slot, whereby a difference of potential is caused to exist across the slot.

2. An antenna as set forth in claim 1, in which said inner conductor is coaxial with said cylindrical shell.

3. An antenna as set forth in claim 1, in which short circuit means are connected across the slots near their ends.

4. An antenna as set forth in claim 1, in which the internal conductor is connected to one side of the slot substantially midway between the ends of the slot and in which the ends of the slot have short circuiting means across the slot.

5. An antenna as set forth in claim 1, in which the section at the end of the cylinder merging into the coaxial line tapers in cross sectional area towards the coaxial line.

6. A system as set forth in claim 1, in which the cylinder has divergingly extending wings extending outward from the cylinder adjacent the sides of the slot, said wings having a width not substantially less than the diameter of the cylinder.

7. An antenna as set forth in claim 3, in which the distance from the connection of the internal conductor to the vicinity of the slot to the first short circuiting means on either side of said conductive connection from the internal conductor is equal to substantially one wave length long where the wave length corresponds to a frequency within the operating band.

8. An antenna as set forth in claim 4, in which the interior cross sectional area of the cylinder omitting the area of the internal conductor is substantially .014 square wave length where the wave length corresponds to a frequency within the operating band.

9. An antenna with outer and inner conductors and with a single longitudinal slot in the outer conductor and electrically coupled means connecting the inner conductor to the outer conductor adjacent one side of the slot.

10. An antenna with outer and inner conductors and with a single longitudinal slot in the outer conductor and electrically coupled means connecting the inner conductor to the outer conductor adjacent one side of the slot at distances approximately equal to two wave lengths corresponding to the frequency of the operating band at which the antenna is operated.

11. A device as set forth in claim 9 in which the antenna has short circuit elements across the slot at points between the points of connection of the inner conductor to the outer conductor on one side of the slot.

12. A cylindrical antenna comprising a series of aligned hooplike structures having a common axis, each hoop being open at one side and having the ends of its opening abutting it and fastening to parallel wires, said parallel wires forming the edges of a slot and a conductor extending through said hooplike structure and electrically coupled to one side of the slot.

13. An antenna formed of a cylindrical tube constructed with a series of spaced ribs having a slot extending along one side, and an inner conductor within said cylindrical tube electrically coupled to one side of the slot.

14. A coaxial transmission line having radiating high frequency electro magnetic waves having an outer conductor formed of a cylindrical envelope comprising a series of spaced cylindrical ribs with a slot along one side of the cylinder forming an air gap and an inner conductor extending through the cylinder and connected to the wall of the cylinder adjacent the air gap.

15. In combination, an antenna comprising a metal cylinder with a longitudinal slot formed therein, and a coaxial transmission line having one conductor connected to one end of the cylinder and another conductor electrically coupled within the cylinder to the wall thereof at a point closer to one side of said slot than the other.

16. In combination, an antenna comprising a metal cylinder with a longitudinal slot formed therein, and a coaxial transmission line having one conductor connected to one end of the cylinder and another conductor connected within the cylinder to the wall thereof at a point closer to one side of said slot than the other.

References Cited in the file of this patent

UNITED STATES PATENTS

| | | |
|---|---|---|
| 2,206,923 | Southworth | July 9, 1940 |
| 2,207,845 | Wolff | July 16, 1940 |
| 2,234,293 | Usselman | Mar. 11, 1941 |
| 2,238,770 | Blumlein | Apr. 15, 1941 |
| 2,239,724 | Lindenblad | Apr. 29, 1941 |
| 2,253,501 | Barrow | Aug. 26, 1941 |
| 2,292,496 | Baeyer | Aug. 11, 1942 |
| 2,379,047 | Thomas | June 26, 1945 |
| 2,400,867 | Lindenblad | May 21, 1946 |
| 2,414,266 | Lindenblad | Jan. 14, 1947 |
| 2,433,368 | Johnson | Dec. 30, 1947 |
| 2,465,245 | Mabry | Mar. 22, 1949 |
| 2,474,137 | Young | June 21, 1949 |
| 2,513,007 | Darling | June 27, 1950 |
| 2,521,550 | Smith | Sept. 5, 1950 |
| 2,556,094 | Lindenblad | June 5, 1951 |
| 2,605,411 | Riblet | July 29, 1952 |

OTHER REFERENCES

Hendrickson "Dual Rocket Antenna" in Radio, July 1946.